(12) United States Patent
Gu et al.

(10) Patent No.: US 11,644,413 B2
(45) Date of Patent: May 9, 2023

(54) METHOD FOR MEASURING DIELECTRIC TENSOR OF MATERIAL (71) Applicant: HUAZHONG UNIVERSITY OF SCIENCE AND TECHNOLOGY, Hubei (CN)

(72) Inventors: Honggang Gu, Hubei (CN); Baokun Song, Hubei (CN); Shiyuan Liu, Hubei (CN); Zhengfeng Guo, Hubei (CN); Mingsheng Fang, Hubei (CN); Hao Jiang, Hubei (CN); Xiuguo Chen, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 76 days.

(21) Appl. No.: 17/054,170

(22) PCT Filed: May 15, 2020

(86) PCT No.: PCT/CN2020/090591
§ 371 (c)(1),
(2) Date: Nov. 10, 2020

(87) PCT Pub. No.: WO2021/036354
PCT Pub. Date: Mar. 4, 2021

(65) Prior Publication Data
US 2021/0262922 A1    Aug. 26, 2021

(30) Foreign Application Priority Data

Aug. 26, 2019   (CN) .......................... 201910792395.6

(51) Int. Cl.
*G01N 21/21* (2006.01)
*G06F 17/16* (2006.01)

(52) U.S. Cl.
CPC ........... *G01N 21/211* (2013.01); *G06F 17/16* (2013.01); *G01N 2021/213* (2013.01)

(58) Field of Classification Search
None
See application file for complete search history.

(56) References Cited

U.S. PATENT DOCUMENTS 9,851,294 B1    12/2017  Hofmann et al.
10,073,120 B1 *  9/2018  Hofmann ............... G01N 21/17
(Continued)

FOREIGN PATENT DOCUMENTS

CN    101666626    3/2010
CN    106517086    3/2017
(Continued)

OTHER PUBLICATIONS

Mathias Schubert, "Polarization-dependent Optical Parameters of Arbitrarily Anisotropic Homogeneous Layered Systems," Physical Review B vol. 53 No. 5, Feb. 15, 1996, downloaded from https://journals.aps.org/prb/pdf/10.1103/PhysRevB.53.4265, downloaded on Apr. 8, 2022 (Year: 1996).*

(Continued)

*Primary Examiner* — Eman A Alkafawi
*Assistant Examiner* — Denise R Karavias
(74) *Attorney, Agent, or Firm* — JCIP Global Inc.

(57)    ABSTRACT

The disclosure relates to a method for measuring a dielectric tensor of a material. Firstly, a partial conversion matrix $T_p$ and a transmission matrix $T_t$ are determined by a predetermined initial value $\varepsilon(E)$ of the dielectric tensor of the material to be measured, thereby obtaining a transfer matrix of an electromagnetic wave on a surface of the material to be measured by the partial conversion matrix $T_p$, the transmission matrix $T_t$, and an incident matrix $T_i$, a theoretical Mueller matrix spectrum $MM_{Cal}(E)$ of the material to be (Continued)

measured is determined by the transfer matrix $T_m$. A fitting analysis is performed on the theoretical Mueller matrix spectrum $MM_{Cal}(E)$ and a measured Mueller matrix spectrum $MM_{Exp}(E)$ of the material to be measured to obtain the dielectric tensor of the material to be measured.

5 Claims, 2 Drawing Sheets

(56) References Cited

U.S. PATENT DOCUMENTS

| | | | | |
|---|---|---|---|---|
| 2013/0321810 | A1* | 12/2013 | Wang | G03F 7/70625 356/369 |
| 2017/0023464 | A1* | 1/2017 | Arieli | G01N 21/211 |
| 2018/0059019 | A1 | 3/2018 | Chouaib et al. | |
| 2018/0164566 | A1* | 6/2018 | Chen | G01N 21/21 |
| 2019/0094711 | A1* | 3/2019 | Atkins | G01B 11/0625 |
| 2019/0317010 | A1* | 10/2019 | Liu | G01N 21/274 |
| 2020/0292467 | A1* | 9/2020 | Malkova | G01N 21/211 |

FOREIGN PATENT DOCUMENTS

| | | |
|---|---|---|
| CN | 108535198 | 9/2018 |
| CN | 109115695 | 1/2019 |
| CN | 110596011 | 12/2019 |

OTHER PUBLICATIONS

Penninckx et al., "Jones matrix of polarization mode dispersion," Jul. 1, 1999, Optics Letters, vol. 24 No. 13, downloaded from https://opg.optica.org/ol/fulltext.cfm?uri=ol-24-13-875&id=37343#articleBody on Aug. 16, 2022 (Year: 1999).*

Beaudry et al., "Dielectric tensor measurement from a single Mueller matrix image," 2007, Journal of the Optical Society of America A, vol. 23 Issue 3, pp. 814-824, downloaded from https://opg.optica.org/josaa/fulltext.cfm?uri=josaa-24-3-814&id=127082 on Apr. 6, 2066 (Year: 2007).*

Jane Hung, "Energy Optimization of a Diatomic System," May 25, 2012, downloaded fromhttps://sites.math.washington.edu/~morrow/papers/jane-thesis.pdf on Feb. 13, 2023 (Year: 2012).*

Paula K. Smith, et al., "P-93: Characterizing dielectric tensors with biaxial ellipsometry." 2008 SID International Symposium Digest of Technocial Papers, vol. 39, May 7, 2012, pp. 1533-1536.

Neil A. Beaudry, et al., "Dielectric tensor measurement from a single Mueller matrix image." Journal of the Optical Society of America A, vol. 24, No. 3, Mar. 2007, pp. 814-827.

Wu Chongqing, et al., "Research progress on quaternion polarization optics." Laser Journal, vol. 40, No. 1, Jan. 2019, pp. 1-10.

Jiang Chunguang, et al., "All-reflective Broadband Spectroscopic Imaging Ellipsometer." Opto-Electronic Engineering, vol. 43, No. 1, Jan. 2016, pp. 55-59.

Chen Xiu-Guo, et al., "Accurate measurement of templates and imprinted grating structures using Mueller matrix ellipsometry." Acta Phys. Sin., vol. 63, No. 18, Sep. 2014, pp. 180701-1-180701-12.

Yilei Li, et al., "Measurement of the optical dielectric function of transition metal dichalcogenide monolayers: MoS2, MoSe2, WS2 and WSe2." Physical Review B, vol. 90, No. 20, Nov. 2014, pp. 1-19.

C. Bundesmann, et al., "Infrared dielectric functions and crystal orientation of a-plane ZnO thin films on r-plane sapphire determined by generalized ellipsometry." Thin Solid Films, vol. 455-456, May 2004, pp. 161-166.

G.E. Jellison Jr., et al., "Spectroscopic dielectric tensor of monoclinic crystals: CdWO4." Physical Review B, vol. 84, Nov. 2011, pp. 195439-1-195439-13.

Xianping Chen, et al., "Electronic structure and optical properties of graphene/stanene heterobilayer." Phys. Chem. Chem. Phys., vol. 18, No. 24, Jun. 2016, pp. 16302-16309.

Jiyong Yao, "BaGa4Se7: a New Congruent-Melting IR Nonlinear Optical Material." Inorganic Chemistry Article, vol. 49, No. 20., Sep. 2010, pp. 9212-9216.

"International Search Report (Form PCT/ISA/210)"of PCT/CN2020/090591, dated Aug. 19, 2020, pp. 1-5.

"Written Opinion of the International Searching Authority (Form PCT/ISA/237)" of PCT/CN2020/090591, dated Aug. 19, 2020, pp. 1-5.

* cited by examiner

METHOD FOR MEASURING DIELECTRIC TENSOR OF MATERIAL

CROSS-REFERENCE TO RELATED APPLICATION

This application is a 371 of international application of PCT application serial no. PCT/CN2020/090591, filed on May 15, 2020, which claims the priority benefit of China application no. 201910792395.6, filed on Aug. 26, 2019. The entirety of each of the above mentioned patent applications is hereby incorporated by reference herein and made a part of this specification.

BACKGROUND

Technical Field

The disclosure relates to the research field of basic physical properties of materials, and more specifically relates to a method for measuring a dielectric tensor of a material.

Description of Related Art

The continuous development and progress of material science has accelerated the process of human industrialization. In-depth research and innovative applications of photoelectric, mechanical, thermal, and other microscopic properties of materials are the core engine that drives the highly efficient operation of national industrial machinery. Today, in this information age, the basic physical and chemical properties of materials have received great attention. Since the beginning of the $21^{st}$ century, with the progress and maturity of material synthesis processes, a lot of nanomaterials have been manufactured with high quality, and new materials such as quantum dots, nanowires (nanotubes), and two-dimensional materials are emerging in endlessly. As such, some novel devices with down-sizing, miniaturization, and quantization have been continuously designed and manufactured, and have gradually moved from the laboratory to the industry. Some innovative device based on new materials exhibit excellent properties and have some peculiar attributes (such as polarization-dependent photoelectric response, anisotropic photoelectric response, quantum Hall effect, superconductivity, topological properties, Weyl semimetallic properties, etc.). Although these excellent attributes may significantly improve the performance of the corresponding device, the final performance of the device directly depends on a series of intrinsic physical parameters of the constituent material, especially the dielectric tensor thereof. To accurate acquire the dielectric tensor of a material has profound importance for exploring and understanding piezoelectric, ferroelectric, pyroelectric, and other intrinsic properties. In addition, the analysis and research of the dielectric tensor of the material may also improve the in-depth quantitative design and performance improvement of the corresponding device.

The dielectric tensor of the material is a second-rank tensor related to frequency. Among 32 crystal classes, the number of independent elements in the dielectric tensor is closely related to the symmetry thereof. For composite materials such as polymers, the number of independent elements in the dielectric tensor is related to the internal microstructure and mesoscopic orientation thereof. The current research on the material-oriented dielectric tensor is generally limited to cubic, tetragonal, trigonal, hexagonal, and orthorhombic crystals which are highly symmetric. For crystals with low-symmetry, the research on materials with non-diagonalizable dielectric tensors (monoclinic and triclinic crystals). Even some tetragonal, trigonal, and hexagonal two-dimensional crystals are directly processed as optical homogeneous substances in order to obtain a general dielectric function (simplified expression of the dielectric tensor).

In the literature "Li Y, et al. Measurement of the optical dielectric function of transition metal dichalcogenide monolayers: $MoS_2$, $MoSe_2$, $WS_2$ and $WSe_2$. Phys. Rev. B 2016, 90: 205422", the dielectric functions of monolayer and bulk $MoS_2$ are obtained using spectral ellipsometer (SE) measurement and analysis. However, the literature only discloses an overall dielectric function, instead of a complete dielectric tensor. Such method may be used for monolayer materials, but not suitable for bulk materials. In Patent Application No. CN109115695A on "Method for Extracting Optical Constants and Euler Angles of Anisotropic Bulk Material", the Muller matrix ellipsometry and the 4×4 matrix method are combined to obtain the anisotropic equivalent complex refractive indexes of polymer bulk materials. Such method is easy to implement and is rich in the measured information, but the method does not extend to the most general case such as the dielectric tensor of the material. In the literature "Bundesmann, et al. Infrared dielectric functions and crystal orientation of a-plane ZnO thin films on r-plane sapphire determined by generalized ellipsometry. Thin Solid Films 2004, 455: 161-166", the dielectric response of the ZnO film in the infrared band is studied using the generalized spectral ellipsometer (GSE). There are only two independent elements in the dielectric tensor of ZnO. The dielectric tensor thereof may be obtained by performing multi-azimuth measurement and analysis using the GSE. In the literature "Jellison Jr., et al. Spectroscopic dielectric tensor of monoclinic crystals: CdWO. Phys. Rev. B 2011, 84: 195439", a monoclinic $CdWO_4$ crystal is prepared. Then, the dielectric tensor of the $CdWO_4$ crystal from visible light to near-infrared is solved by measuring with the GSE and by using the 4×4 matrix method. Such method is more complicated and requires a large number of measurements of multiple crystallographic directions of the material to be measured to obtain a relatively accurate result.

In recent years, with the continuous development and maturity of the first-principle calculation based on density functional theory, theoretical simulation calculation has been gradually introduced in the research field of the dielectric tensor of the material. For example, in the literature "Chen, et al. Electronic structure and optical properties of graphene/stanene heterobilayer. Phys. Chem. Chem. Phys. 2016, 18: 16302", the dielectric function of graphene/stanene heterobilayer is calculated using the Dmol software package. With the continuous development of theoretical calculations, the accuracy of theoretical predictions of the basic physical and chemical properties of materials is constantly improving. However, there are still thorny issues such as insufficient strength, characteristic mismatch, and expensive calculation. Therefore, there is still a big difference between the theoretical calculation result and the experimental result of the dielectric tensor of the material.

In summary, a comprehensive system and an easy-to-operate solution have not yet been provided for the current acquisition of the dielectric tensor of the material, especially the extraction of dielectric tensors of non-diagonalizable materials.

SUMMARY

In view of the defects or improvement requirements of the prior art, the disclosure provides a method and a device for measuring a dielectric tensor of a material. The objective is to introduce an initial value of the dielectric tensor of the material to be measured into the 4×4 matrix method for modeling, thereby obtaining the theoretical Mueller matrix spectrum of the material. A fitting analysis is performed on the theoretical Mueller matrix spectrum and the measured Mueller matrix spectrum to extract the complete dielectric tensor of the material. The method is based on general theory and the obtained result is reliable, which is suitable for solving dielectric tensors of various materials.

To achieve the above objective, the disclosure provides a method for measuring a dielectric tensor of a material, which includes the following steps.

S1: a partial conversion matrix $T_p$ and a transmission matrix $T_t$ are determined by a predetermined initial value $\varepsilon(E)$ of the dielectric tensor of the material to be measured, thereby obtaining a transfer matrix $T_m = T_i^{-1} T_p T_t$ of an electromagnetic wave on a surface of the material to be measured by the partial conversion matrix $T_p$, the transmission matrix $T_t$, and an incident matrix $T_i$.

S2: a theoretical Mueller matrix spectrum $MM_{Cal}(E)$ of the material to be measured is determined by the transfer matrix $T_m$. Then, a fitting analysis is performed on the theoretical Mueller matrix spectrum $MM_{Cal}(E)$ and a measured Mueller matrix spectrum $MM_{Exp}(E)$ of the material to be measured to obtain the dielectric tensor of the material to be measured.

As further preferred, the incident matrix $T_i$ is calculated by the following equation:

$$T_i[E_{is}\ E_{rs}\ E_{ip}\ E_{rp}]^T = [(E_{ip}-E_{rp})\cos\theta_i\ E_{is}-E_{rs}(B_{rs}-B_{is})\ \cos\theta_i\ B_{ip}+B_{rp}]^T$$

wherein, $E_{is}$ is an electric field of an incident s-polarized light and $E_{rs}$ is an electric field of a reflected s-polarized light, $E_{ip}$ is an electric field of an incident p-polarized light and $E_{rp}$ is an electric field of a reflected p-polarized light, $B_{is}$ is a magnetic field of the incident s-polarized light and $B_{rs}$ is an magnetic field of the reflected s-polarized light, $B_{ip}$ is a magnetic field of the incident p-polarized light and $B_{rp}$ is a magnetic field of the reflected p-polarized light, and $\theta_i$ is an incident angle of an electromagnetic wave.

As further preferred, determining a partial conversion matrix $T_p$ by the predetermined initial value $\varepsilon(E)$ of the dielectric tensor of the material to be measured specifically includes the following steps.

(1) Determine a matrix $\Delta_B$ by the predetermined initial value $\varepsilon(E)$ of the dielectric tensor of the material to be measured:

$$\Delta_B = \begin{bmatrix} -n_i\sin\theta_i/(\varepsilon_{31}/\varepsilon_{33}) & -n_i\sin\theta_i/(\varepsilon_{32}/\varepsilon_{33}) & 0 & 1-(n_i\sin\theta_i)^2/\varepsilon_{33} \\ 0 & 0 & -1 & 0 \\ \varepsilon_{23}(\varepsilon_{31}/\varepsilon_{33})-\varepsilon_{21} & (n_i\sin\theta_i)^2-\varepsilon_{22}+\varepsilon_{23}(\varepsilon_{32}/\varepsilon_{33}) & 0 & n_i\sin\theta_i/(\varepsilon_{23}/\varepsilon_{33}) \\ \varepsilon_{11}-\varepsilon_{13}(\varepsilon_{31}/\varepsilon_{33}) & \varepsilon_{12}-\varepsilon_{13}(\varepsilon_{32}/\varepsilon_{33}) & 0 & -n_i\sin\theta_i/(\varepsilon_{13}/\varepsilon_{33}) \end{bmatrix}$$

wherein, $\theta_i$ is the incident angle of the electromagnetic wave, $n_i$ is the refractive index of an external medium, and the initial value of the dielectric tensor is $$\varepsilon(E) = \begin{bmatrix} \varepsilon_{11} & \varepsilon_{12} & \varepsilon_{13} \\ \varepsilon_{21} & \varepsilon_{22} & \varepsilon_{23} \\ \varepsilon_{31} & \varepsilon_{32} & \varepsilon_{33} \end{bmatrix};$$

(2) Determine the partial conversion matrix $T_p = \exp[i(\omega/c)\Delta_B(-d)]$ is determined by the matrix $\Delta_B$, where $\omega$ is the angular frequency of the electromagnetic wave, c is the speed of light in vacuum, d is the thickness of the material to be measured, and i is the unit imaginary number.

As further preferred, determining the transmission matrix $T_t$ by the predetermined initial value $\varepsilon(E)$ of the dielectric tensor of the material to be measured specifically includes the following steps.

(1) Calculate the transmission matrix $T_t$ by the following equation if the material to be measured is an optical homogeneous substance:

$$T_t[E_{ts}\ 0\ E_{tp}\ 0]^T = [E_{tp}\cos\theta_t\ E_{ts}-B_{ts}\cos\theta_t\ B_{tp}]^T$$

where, $\theta_t$ is the transmission angle of the electromagnetic wave, $E_{ts}$ is an electric field of a transmitted s-polarized light and $B_{ts}$ i is a magnetic field of the transmitted s-polarized light, and $E_{tp}$ is an electric field of a transmitted p-polarized light and $B_{tp}$ is a magnetic field of the transmitted p-polarized light.

(2) perform a characteristic analysis is performed on the matrix $\Delta_B$ determined by the initial value $\varepsilon(E)$ of the dielectric tensor when the material to be measured is a non-optical homogeneous substance, thereby obtaining the transmission matrix $T_t$.

As further preferred, determining the theoretical Muller matrix spectrum $MM_{Cal}(E)$ of the material to be measured by the transfer matrix $T_m$ specifically includes the following steps.

(1) determine a theoretical Jones matrix $J_{Cal}$ is determined by the transfer matrix $T_m$:

$$J_{Cal} = \frac{1}{t_{11}t_{33}-t_{13}t_{31}} \begin{bmatrix} (t_{11}t_{43}-t_{13}t_{41}) & (t_{33}t_{41}-t_{31}t_{43}) \\ (t_{11}t_{23}-t_{13}t_{21}) & (t_{21}t_{33}-t_{23}t_{31}) \end{bmatrix}$$

wherein, the transfer matrix $$T_m = \begin{bmatrix} t_{11} & t_{12} & t_{13} & t_{14} \\ t_{21} & t_{22} & t_{23} & t_{24} \\ t_{31} & t_{32} & t_{33} & t_{34} \\ t_{41} & t_{42} & t_{43} & t_{44} \end{bmatrix};$$

(2) determine the theoretical Muller matrix spectrum $MM_{Cal}(E)$ of the material to be measured is determined by the theoretical Jones matrix $J_{Cal}$:

$$MM_{Cal}(E) = A(J_{Cal} \otimes J_{Cal}^*)A^{-1}, \text{ where } A = \begin{bmatrix} 1 & 0 & 0 & 1 \\ 1 & 0 & 0 & -1 \\ 0 & 1 & 1 & 0 \\ 0 & i & -i & 0 \end{bmatrix}.$$

As further preferred, the measured Mueller matrix spectrum $MM_{Exp}(E)$ is preferably measured through a Mueller matrix ellipsometer.

As further preferred, the Mueller matrix ellipsometer preferably obtains a plurality of sets of the measured Mueller matrix spectra $MM_{Exp}(E)$ of the material to be measured from a plurality of incident angles and azimuth angles, and fits the plurality of sets of the measured Mueller matrix spectra $MM_{Exp}(E)$ with the theoretical Mueller matrix spectrum $MM_{Cal}(E)$ at the same time.

In general, compared with the prior art, the above technical solutions conceived by the disclosure mainly have the following technical advantages.

1. The disclosure introduces the dielectric tensor of the material to be measured into the 4×4 matrix method for modeling, thereby obtaining the theoretical Mueller matrix spectrum of the material, so as to extract the complete dielectric tensor of the material. The method is based on general theory, the operation process is clear, and the obtained result is comprehensive and reliable, which is suitable for solving dielectric tensors of various materials, including materials with low-symmetry whose dielectric tensors cannot be diagonalized. The method has important significance for in-depth and comprehensive research on the physical and chemical properties of the material.

2. The disclosure appropriately obtains the measured Mueller matrix spectrum of the multiple incident angles and multiple azimuth angles of the material. On one hand, the accuracy of the final obtained dielectric tensor can be effectively improved. On the other hand, considering the richness of the Mueller matrix information, without increasing the number of measurement as much as possible, the issue that a large number of measurements of multiple crystallographic directions of the material is required to ensure the accuracy of the final obtained dielectric tensor in the past can be solved to a certain degree.

BRIEF DESCRIPTION OF THE DRAWINGS

FIGS. 4A to 4D are schematic diagrams of a dielectric tensor of the $BaGa_4Se_7$ crystal according to an embodiment of the disclosure, where FIG. 4A is element $\varepsilon_{11}$, FIG. 4B is element $\varepsilon_{12}$, FIG. 4C is element $\varepsilon_{22}$, and FIG. 4D is element $\varepsilon_{33}$.

DETAILED DESCRIPTION OF DISCLOSED EMBODIMENTS

For the objective, technical solutions, and advantages of the disclosure to be clearer, the disclosure is further described in detail below with reference to the accompanying drawings and the embodiments. It should be understood that the specific embodiments described here are only used to explain the disclosure, but not to limit the disclosure. In addition, the technical features involved in the various embodiments of the disclosure described below may be combined with each other as long as there is no conflict therebetween.

Figure 1:
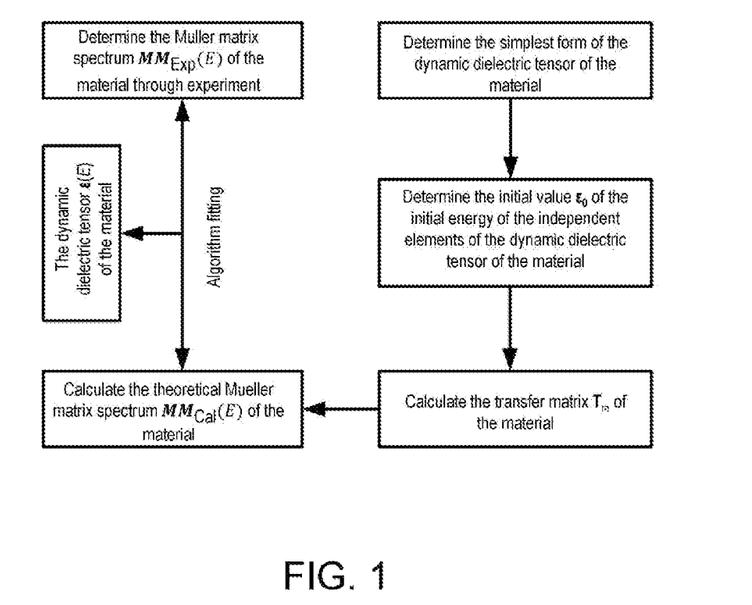
FIG. 1 is a flowchart of a method for measuring a dielectric tensor of a material according to an embodiment of the disclosure.

A method for measuring a dielectric tensor of a material provided by an embodiment of the disclosure, as shown in FIG. 1, includes the following steps.

S1: a measured Mueller matrix spectrum $MM_{Exp}(E)$ within a specified energy range of a material to be measured is determined, where E represents the energy of the electromagnetic wave, which one-to-one corresponds to the frequency. The measured Muller matrix spectrum $MM_{Exp}(E)$ is obtained through experimental measurement, literature review, etc., and is preferably measured through a Muller matrix ellipsometer. Further, during measurement, the Mueller matrix ellipsometer obtains a plurality of sets of the measured Mueller matrix spectra $MM_{Exp}(E)$ of the material to be measured from a plurality of incident angles and azimuth angles.

S2: the form of the dielectric tensor of the material to be measured is determined. The general form of the dielectric tensor is as shown in Equation (1). Equation (1) is preferably simplified through a diagonalization operation, thereby obtaining the most simplified form of a dielectric tensor $\varepsilon(E)$;

$$\varepsilon(E) = \begin{bmatrix} \varepsilon_{11} & \varepsilon_{12} & \varepsilon_{13} \\ \varepsilon_{21} & \varepsilon_{22} & \varepsilon_{23} \\ \varepsilon_{31} & \varepsilon_{32} & \varepsilon_{33} \end{bmatrix} \quad (1)$$

wherein, $\varepsilon_{ij}$ (i, j=1, 2, 3) are the elements of the dielectric tensor, and each element is a complex number and is a function of energy (frequency). Specifically, for crystal materials, the number of independent elements and the simplest form of the $\varepsilon(E)$ in a certain energy range are determined according to the symmetry thereof through checking the crystal structure manual. Generally speaking, the lower-symmetry of the crystal, the more number of independent elements in the $\varepsilon(E)$, and it is more difficult to determine. For example, a triclinic crystal has 6 independent elements. For composite materials, the number of independent elements and the simplest distribution form of the $\varepsilon(E)$ in a certain energy range are effectively given through the molecular structure and mesoscopic orientation.

Then, by using experimental measurement and data analysis, literature survey, and theoretical simulation, the predetermined initial value of the dielectric tensor $\varepsilon(E)$ are calculated. Specifically, for materials with low-symmetry, the principle of selecting the initial values of the elements of the dielectric tensor is: the main diagonal elements are similar and the non-diagonal elements are close to 0.

S3: a transfer matrix $T_m$ of the material is determined.

Figure 2:
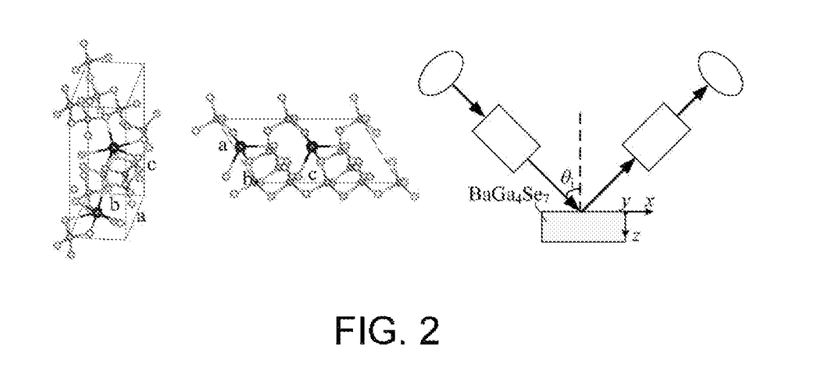
FIG. 2 are schematic diagrams of crystal structures and ellipsometry of $BaGa_4Se_7$ according to an embodiment of the disclosure.

As shown in FIG. 2, an incident surface of an electromagnetic wave of the material to be measured is taken as an xoy surface, and a coordinate system is established with the thickness direction of the material as the z-axis direction. Electromagnetic waves passing through upper and lower surfaces of the material may be connected by the 4×4 transfer matrix $T_m$, which is specifically expressed as:

$$[E_x \, E_y \, H_x \, H_y]_{z=0}^T = T_m [E_x \, E_y \, H_x \, H_y]_{z=d}^T = T_i^{-1} T_p T_t [E_x \, E_y \, H_x \, H_y]_{z=d}^T \quad (2)$$

wherein, $E_x$ is an electric field in the x-direction and $E_y$ is the electric field in the y-direction, and $H_x$ is a magnetic field in the x-direction and $H_y$ is a magnetic field in the y-direction; and z=0 represents the incident surface (upper surface) of the electromagnetic wave of the material to be measured, z=d represents another surface (lower surface) of the material to be measured, and d is the thickness of the material to be measured.

It can be known from Equation (2) that: the transfer matrix $T_m = T_i^{-1} T_p T_t$; wherein, $T_i$ is the incident matrix, which projects the electromagnetic wave obliquely incident on the upper surface of the material to the upper surface of the material along the positive direction of the z-axis, and the inverse matrix $T_i^{-1}$ converts the electromagnetic wave on the upper surface of the material into an obliquely reflected electromagnetic wave along the negative direction of the z-axis; $T_t$ is the transmission matrix, which projects the electromagnetic wave transmitted from the lower surface of the material to the lower surface of the material along the negative direction of the z-axis; and $T_p$ is the partial conversion matrix, which links electromagnetic fields on the upper and lower surfaces of the material.

Preferably, when the material to be measured is a bulk crystal, the transfer matrix of electromagnetic waves on the upper and lower surfaces thereof is $T_m = T_i^{-1} T_t$.

Specifically, the calculation method of each matrix is as follows.

(1) The incidence matrix $T_i$ is calculated according to the in-plane form of the electromagnetic field at z=0 of the material, which is then inverted to obtain $T_i^{-1}$. The incidence matrix $T_i$ is specifically calculated by the following equation:

$$T_i[E_{is}\ E_{rs}\ E_{ip}\ E_{rp}]^T = [(E_{ip}-E_{rp})\cos\theta_i\ E_{is}-E_{rs}(B_{rs}-B_{is})\ \cos\theta_i\ B_{ip}+B_{rp}]^T \quad (3)$$

wherein, $E_{is}$ is an electric field of the incident s-polarized light and $E_{rs}$ is an electric field of a reflected s-polarized light, $E_{ip}$ is an electric field of an incident p-polarized light and $E_{rp}$ is an electric field of a reflected p-polarized light, $B_{is}$ is a magnetic field of the incident s-polarized light and $B_{rs}$ is a magnetic field of the reflected s-polarized light, and $B_{ip}$ is a magnetic field of the incident p-polarized light and $B_{rp}$ is a magnetic field of the reflected p-polarized light; and $\theta_i$ is the incident angle of the electromagnetic wave.

(2) The partial conversion matrix is solved according to the Berreman equation, wherein, $n_i$ is the refractive index of an external medium, i is the unit imaginary number, $\omega$ is the angular frequency of the electromagnetic wave, c is the speed of light in vacuum, d is the thickness of the material to be measured, and $\Delta_B$ is the fourth-rank matrix in the Berreman equation:

$$\Delta_B = \begin{bmatrix} -n_i\sin\theta_i(\varepsilon_{31}/\varepsilon_{33}) & -n_i\sin\theta_i(\varepsilon_{32}/\varepsilon_{33}) & 0 & 1-(n_i\sin\theta_i)^2/\varepsilon_{33} \\ 0 & 0 & -1 & 0 \\ \varepsilon_{23}(\varepsilon_{31}/\varepsilon_{33})-\varepsilon_{21} & (n_i\sin\theta_i)^2-\varepsilon_{22}+\varepsilon_{23}(\varepsilon_{32}/\varepsilon_{33}) & 0 & n_i\sin\theta_i(\varepsilon_{23}/\varepsilon_{33}) \\ \varepsilon_{11}-\varepsilon_{13}(\varepsilon_{31}/\varepsilon_{33}) & \varepsilon_{12}-\varepsilon_{13}(\varepsilon_{32}/\varepsilon_{33}) & 0 & -n_i\sin\theta_i(\varepsilon_{13}/\varepsilon_{33}) \end{bmatrix} \quad (4)$$

(3) The transmission matrix $T_t$ method is calculated and determined according to the physical properties of the material to be measured, which specifically includes the following steps.

(3.1) If the material to be measured is an optical homogeneous substance, the transmission matrix $T_t$ is calculated according to the in-plane form of the electromagnetic field at z=d of the material. The transmission matrix $T_t$ is specifically calculated by the following equation:

$$T_t[E_{ts}\ 0\ E_{tp}\ 0]^T = [E_{tp}\cos\theta_t\ E_{ts}-B_{ts}\cos\theta_t B_{tp}]^T \quad (5)$$

wherein, $\theta_t$ is the transmission angle of the electromagnetic wave, $E_{ts}$ is an electric field of a transmitted s-polarized light and $B_{ts}$ is a magnetic field of the transmitted s-polarized light, and $E_{tp}$ is an electric field of a transmitted p-polarized light and $B_{tp}$ is a magnetic field of the transmitted p-polarized light.

(3.2) If the material to be measured is a non-optical homogeneous substance, the transmission matrix $T_t$ is determined through a characteristic analysis of the matrix $\Delta_B$. For materials with no or negligible back reflection, the eigenvectors corresponding to the non-negative eigenvalues of the $\Delta_B$ are written to the first and third columns of the fourth-rank empty matrix to obtain the transmission matrix $T_t$.

S4: a theoretical Muller matrix spectrum $MM_{Cal}(E)$ of the material to be measured is determined by the transfer matrix $T_m$, which specifically includes the following steps.

(1) A theoretical Jones matrix $J_{Cal}$ is determined by the transfer matrix $T_m$:

$$J_{Cal} = \frac{1}{t_{11}t_{33}-t_{13}t_{31}}\begin{bmatrix} (t_{11}t_{43}-t_{13}t_{41}) & (t_{33}t_{41}-t_{31}t_{43}) \\ (t_{11}t_{23}-t_{13}t_{21}) & (t_{21}t_{33}-t_{23}t_{31}) \end{bmatrix} \quad (6)$$

(2) The theoretical Muller matrix spectrum $MM_{Cal}(E)$ of the material to be measured is determined by the theoretical Jones matrix $J_{Cal}$:

$$MM_{Cal}(E) = A(J_{Cal} \otimes J_{Cal}^*)A^{-1} \quad (7)$$

wherein, $t_{ij}$ (i, j=1, 2, 3, 4) are the elements in the transfer matrix $T_m$; and $J_{Cal}^*$ is the complex conjugate of the $J_{cal}$, and $$A = \begin{bmatrix} 1 & 0 & 0 & 1 \\ 1 & 0 & 0 & -1 \\ 0 & 1 & 1 & 0 \\ 0 & i & -i & 0 \end{bmatrix}.$$

S5: the Levenberg-Marquardt or Trust-Region-Reflective algorithm is adopted to perform fitting and matching analyses at each energy frequency on multiple sets of the measured Mueller matrix spectra $MM_{Exp}(E)$ and the theoretical Mueller matrix spectrum $MM_{Cal}(E)$ The dielectric tensor at the highest coincidence degree of element matching is selected as the most reliable dielectric tensor of the material to be measured at the frequency, thereby obtaining the complete dielectric tensor of the material to be measured.

The following are specific embodiments.

Embodiment 1

The dielectric tensor of a $BaGa_4Se_7$ crystal in an energy E range of 0.73-6.42 eV is calculated, which specifically includes the following steps.

Figure 3:
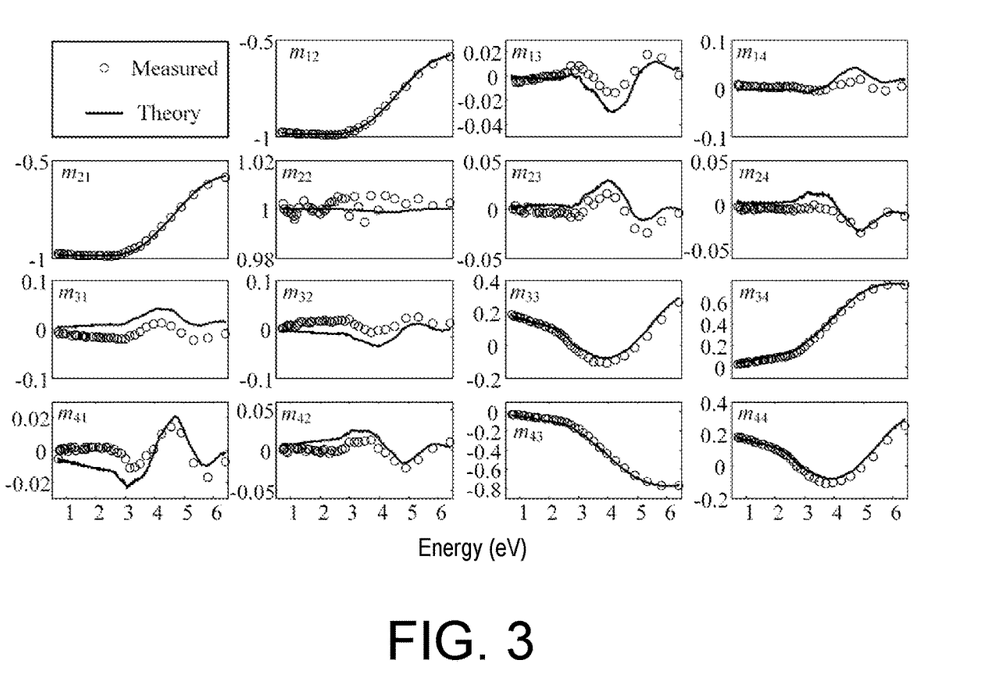
FIG. 3 is a test and a theoretical Muller matrix spectrum of a $BaGa_4Se_7$ crystal in the energy range of 0.73-6.42 eV according to an embodiment of the disclosure.
Figure 4A:
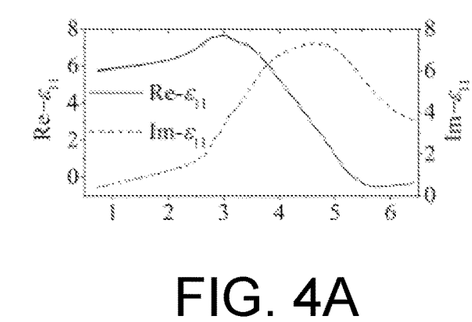
Figure 4B:
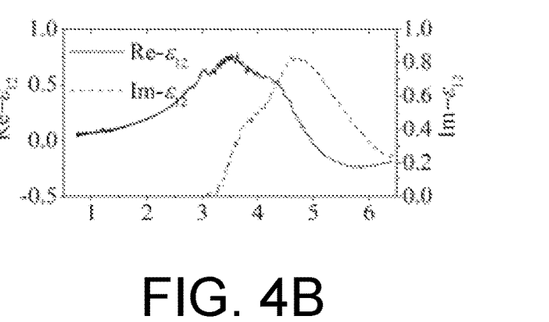
Figure 4C:
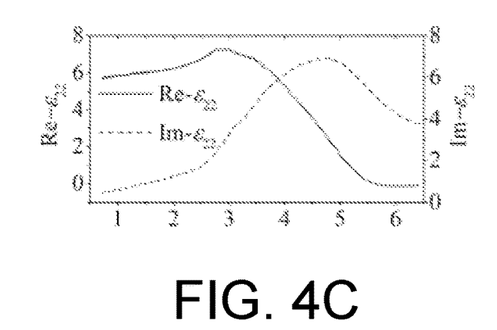
Figure 4D:
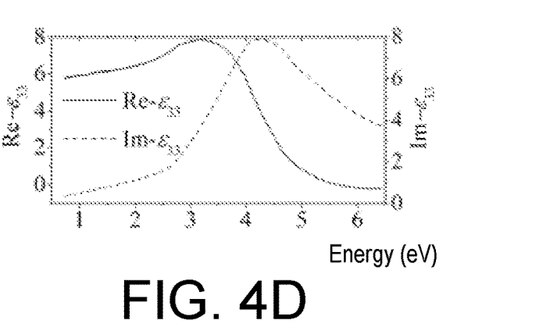

S1: a measured Mueller matrix spectrum $MM_{BaGa_4Se_7}^{Exp}(E)$ of the $BaGa_4Se_7$ crystal in the energy range of 0.73-6.42 eV is determined. As shown in FIG. 2, the Mueller matrix ellipsometer (MME) is adopted for measurements of multiple incident angles ($\theta_i$=60°, 65°, 70°) and multiple azimuth angles (three azimuth angles of 45°, 60°, and 75° are selected in each measurement plane) of three measurement planes (xoy, xoz, zoy) of the monoclinic $BaGa_4Se_7$ crystal. A total of 27 sets of the measured Mueller matrix spectra are obtained. As shown in FIG. 3, the scatters are the measured Muller matrix spectra at the 45° azimuth angle and the 70° incident angle of the measured xoy plane. In the drawing, $m_{ij}$ (i,j=1, 2, 3, 4) represents elements in the i-th row and the j-th column in the Muller matrix spectrum. The spectrum has been normalized by an $m_{11}$ element in the Muller matrix ($m_{11}=1$, not shown).

S2: the simplest form of the dielectric tensor of the BaGa$_4$Se$_7$ crystal is determined. Referring to the crystal structure manual, the BaGa$_4$Se$_7$ crystal belongs to monoclinic crystal system, a space group Pc, and unit cell parameters: a=7.6252(15) Å, b=6.5114(13) Å, c=14.702(4) Å, β=121.24(2)°, and Z=2. The simplest form of the dielectric tensor of the BaGa$_4$Se$_7$ crystal is $$\varepsilon_{BaGa_4Se_7}(E) = \begin{bmatrix} \varepsilon_{11} & \varepsilon_{12} & \\ \varepsilon_{12} & \varepsilon_{22} & \\ & & \varepsilon_{33} \end{bmatrix}.$$

Referring to the literature "Jiyong Yao et al. BaGa$_4$Se$_7$: A New Congruent-Melting IR Nonlinear Optical Material. Inorg. Chem. 2010, 49: 9212-9216", the initial value of a diagonal independent element of the dielectric tensor at 0.73 eV is initially set as $\varepsilon_0^{jj}$=7.04+i0.68, j=1, 2, 3, and the initial value of a non-diagonal independent element is $\varepsilon_0^{12}$=0+i0.02.

S3: a transfer matrix $$T_{m(BaGa_4Se_7)}$$

of the material is determined.

In the embodiment, the sample atmosphere is air and the refractive index $n_i \approx 1$. Since BaGa$_4$Se$_7$ is a bulk crystal, there is no need to introduce a partial conversion matrix $T_p$. An inverse matrix $$T_{i(BaGa_4Se_7)}^{-1} = \begin{bmatrix} 0 & 1 & -1/2\cos\theta_i & 0 \\ 1/2 & 1 & 1/2\cos\theta_i & 0 \\ 1/2\cos\theta_i & 0 & 0 & 1/2 \\ -1/2\cos\theta_i & 0 & 0 & 1/2 \end{bmatrix}$$

of the incident matrix is obtained by Equation (3).

At the same time, BaGa$_4$Se$_7$ is a crystal with low-symmetry, and the number of independent elements in the dielectric tensor thereof is 4, which are all complex numbers, so the values to be determined are 8. Therefore, a transmission matrix $$T_{t(BaGa_4Se_7)}$$

is in the form of a non-optical homogeneous substance, that is, a characteristic analysis needs to be performed on the $\Delta_B$ matrix in Equation (4) $\Delta B$. When measuring different sections of BaGa$_4$Se$_7$, the simplest dielectric tensor thereof needs to be rotated, that is, modulated using a rotation matrix. The rotation matrix is:

$$R = \begin{bmatrix} \cos\phi\cos\psi - \sin\phi\cos\theta\sin\psi & -\cos\phi\cos\psi - \sin\phi\cos\theta\cos\psi & \sin\phi\sin\theta \\ \sin\phi\cos\psi + \cos\phi\cos\theta\sin\psi & -\sin\phi\sin\psi + \cos\phi\cos\theta\cos\psi & -\cos\phi\sin\theta \\ \sin\phi\sin\psi & \sin\phi\cos\psi & \cos\theta \end{bmatrix}$$

wherein, (θ, φ, Ψ) are the Euler angles. Therefore, a dielectric tensor $\varepsilon_{BaGa_4Se_7}'(E) = R\varepsilon_{BaGa_4Se_7}(E)R^T$ in Equation (4) is finally substituted, thereby obtaining the $\Delta_B$ to find the eigenvalues and eigenvectors thereof, so as to obtain the transmission matrix $$T_{t(BaGa_4Se_7)} = \begin{bmatrix} X_{a1} & 0 & X_{b1} & 0 \\ X_{a2} & 0 & X_{b2} & 0 \\ X_{a3} & 0 & X_{b3} & 0 \\ X_{a4} & 0 & X_{b4} & 0 \end{bmatrix},$$

wherein, the subscripts a and b refer to two positive real part eigenvalues of the $\Delta_B$ matrix, and the vectors $[X_{a1}, X_{a2}, X_{a3}, X_{a4}]^T$ and $[X_{b1}, X_{b2}, X_{b3}, X_{b4}]^T$ are respectively eigenvectors corresponding to the eigenvalues a and b.

Then, the $$T_{i(BaGa_4Se_7)}^{-1}$$

is multiplied by the $$T_{t(BaGa_4Se_7)}$$

to obtain the transfer matrix $$T_{m(BaGa_4Se_7)}.$$

S4: a theoretical Mueller matrix spectrum $MM_{BaGa_4Se_7}^{Cal}$(E) of the BaGa4Se7 crystal is calculated from Equation (6) and Equation (7). As shown in FIG. 3, the solid line is the theoretical Mueller matrix spectrum at the 45° azimuth angle and the 70° incident angle of the calculated xoy plane.

S5: a dielectric tensor $\varepsilon_{BaGa_4Se_7}$(E) of the BaGa4Se7 crystal is extracted. The Levenberg-Marquardt and trust-region-reflective algorithms are adopted to fit and match 27 sets of the theoretical Mueller matrix spectrum $MM_{BaGa_4Se_7}^{Cal}$(E) and the measured Mueller matrix spectra $MM_{BaGa_4Se_7}^{Exp}$(E) at each energy (frequency). The dielectric tensor with the highest degree of matching is considered to be the most reliable dielectric tensor of the material at the frequency. It is found that the dielectric tensors obtained by the two intelligent algorithms are basically consistent. As shown in FIG. 3, the 2 main diagonal 2×2 sub-matrix blocks of $MM_{BaGa_4Se_7}^{Cal}$(E) and $MM_{BaGa_4Se_7}^{Exp}$(E) have good goodness of fit, and the basic trend of fitting of the 2 vice-diagonal 2×2 sub-matrix blocks is consistent.

Finally, the spectrum of each element of the dielectric tensor of the BaGa$_4$Se$_7$ crystal is shown in FIGS. 4A to 4D. In the drawing, Re-$\varepsilon_{ij}$ represents the real part of the element $\varepsilon_{ij}$, and Im-$\varepsilon_{ij}$ represents the imaginary part of the element $\varepsilon_{ij}$. Using such analysis method, not only the main diagonal elements $\varepsilon_{11}$, $\varepsilon_{22}$, and $\varepsilon_{33}$ of the dielectric tensor of the BaGa$_4$Se$_7$ crystal are obtained, the non-diagonal element $\varepsilon_{12}$ is also determined at the same time.

Persons skilled in the art may easily understand that the above descriptions are only the preferred embodiments of the disclosure and are not intended to limit the disclosure. Any modification, equivalent replacement, improvement, etc. made within the spirit and principle of the disclosure should be included in the protection scope of the disclosure.

What is claimed is:

1. A method for measuring a dielectric tensor of a material, comprising:
   S1: determining, by a processor, a partial conversion matrix $T_p$ and a transmission matrix $T_t$ by a predetermined initial value $\varepsilon(E)$ of the dielectric tensor of the material to be measured, thereby obtaining a transfer matrix $T_m = T_i^{-1} T_p T_t$ of an electromagnetic wave on a surface of the material to be measured by the partial conversion matrix $T_p$, the transmission matrix $T_t$, and an incident matrix $T_i$; and
   S2: determining, by the processor, a theoretical Mueller matrix spectrum $MM_{Cal}(E)$ of the material to be measured by the transfer matrix $T_m$,
   S3: measuring a measured Mueller matrix spectrum $MM_{Exp}(E)$ through a Mueller matrix ellipsometer,
   S4: performing, by the processor, a fitting analysis on the theoretical Mueller matrix spectrum $MM_{Cal}(E)$ and the measured Mueller matrix spectrum $MM_{Exp}(E)$ of the material to be measured to obtain the dielectric tensor of the material to be measured,
   wherein a Trust-Region-Reflective algorithm is adopted in the fitting analysis,
   wherein the Mueller matrix ellipsometer obtains a plurality of sets of the measured Mueller matrix spectra $MM_{Exp}(E)$ of the material to be measured from a combination of three incident angles and three azimuth angles of three planes to be measured, and fits the plurality of sets of the measured Mueller matrix spectra $MM_{Exp}(E)$ with the theoretical Mueller matrix spectrum $MM_{Cal}(E)$ at the same time,
   wherein the dielectric tensor of the material to be measured is a dielectric tensor at a highest coincidence degree of fitting,
   wherein the dielectric tensor of the material is used to improve properties of devices using the material,
   wherein the material includes: quantum dots, nanowires (nanotubes), and two-dimensional materials.

2. The method for measuring the dielectric tensor of the material according to claim 1, wherein the incident matrix $T_i$ is calculated by a following equation:

$$T_i[E_{is}\ E_{rs}\ E_{ip}\ E_{rp}]^T = [(E_{ip}-E_{rp})\cos\theta_i\ E_{is}-E_{rs}(B_{rs}-B_{is})\cos\theta_i\ B_{ip}+B_{rp}]^T$$

wherein, $E_{is}$ is an electric field of the incident s-polarized light and $E_{rs}$ is an electric field of a reflected s-polarized light, $E_{ip}$ is an electric field of an incident p-polarized light and $E_{rp}$ is an electric field of a reflected p-polarized light, $B_{is}$ is a magnetic field of the incident s-polarized light and $B_{rs}$ is a magnetic field of the reflected s-polarized light, $B_{ip}$ is a magnetic field of the incident p-polarized light and $B_{rp}$ is a reflected magnetic field of the reflected p-polarized light, and $\theta_i$ is an incident angle of the electromagnetic wave.

3. The method for measuring the dielectric tensor of the material according to claim 1, wherein the step of determining the partial conversion matrix $T_p$ by the predetermined initial value $\varepsilon(E)$ of the dielectric tensor of the material to be measured specifically comprises:

(1) determining a matrix $\Delta_B$ by the predetermined initial value $\varepsilon(E)$ of the dielectric tensor of the material to be measured:

$$\Delta_B = \begin{bmatrix} -n_i\sin\theta_i(\varepsilon_{31}/\varepsilon_{33}) & -n_i\sin\theta_i(\varepsilon_{32}/\varepsilon_{33}) & 0 & 1-(n_i\sin\theta_i)^2/\varepsilon_{33} \\ 0 & 0 & -1 & 0 \\ \varepsilon_{23}(\varepsilon_{31}/\varepsilon_{33})-\varepsilon_{21} & (n_i\sin\theta_i)^2-\varepsilon_{22}+\varepsilon_{23}(\varepsilon_{32}/\varepsilon_{33}) & 0 & n_i\sin\theta_i(\varepsilon_{23}/\varepsilon_{33}) \\ \varepsilon_{11}-\varepsilon_{13}(\varepsilon_{31}/\varepsilon_{33}) & \varepsilon_{12}-\varepsilon_{13}(\varepsilon_{32}/\varepsilon_{33}) & 0 & -n_i\sin\theta_i(\varepsilon_{13}/\varepsilon_{33}) \end{bmatrix}$$

wherein, $\theta_i$ is the incident angle of the electromagnetic wave, $n_i$ is a refractive index of an external medium, and the predetermined initial value of the dielectric tensor is $$\varepsilon(E) = \begin{bmatrix} \varepsilon_{11} & \varepsilon_{12} & \varepsilon_{13} \\ \varepsilon_{21} & \varepsilon_{22} & \varepsilon_{23} \\ \varepsilon_{31} & \varepsilon_{32} & \varepsilon_{33} \end{bmatrix};$$

and
   (2) determining the partial conversion matrix $T_p = \exp[i(\omega/c)\Delta_B(-d)]$ by the matrix $\Delta_B$, where $\omega$ is an angular frequency of the electromagnetic wave, c is a speed of light in vacuum, d is a thickness of the material to be measured, and i is a unit imaginary number.

4. The method for measuring the dielectric tensor of the material according to claim 3, wherein the step of determining the transmission matrix $T_t$ by the predetermined initial value $\varepsilon(E)$ of the dielectric tensor of the material to be measured specifically comprises:

(1) calculating the transmission matrix $T_t$ by a following equation when the material to be measured is an optical homogeneous substance:

$$T_t[E_{ts}\ 0\ E_{tp}\ 0]^T = [E_{tp}\cos\theta_t\ E_{ts}-B_{ts}\cos\theta_t\ B_{tp}]^T$$

wherein, $\theta_t$ is a transmission angle of the electromagnetic wave, $E_{ts}$ is an electric field of a transmitted s-polarized light and $B_{ts}$ is a magnetic field of the transmitted s-polarized light, and $E_{tp}$ is an electric field of a transmitted p-polarized light and $B_{tp}$ is a magnetic field of the transmitted p-polarized light; and
   (2) performing a characteristic analysis on the matrix $\Delta_B$ determined by the predetermined initial value $\varepsilon(E)$ of the dielectric tensor when the material to be measured is a non-optical homogeneous substance, thereby obtaining the transmission matrix $T_t$.

5. The method for measuring the dielectric tensor of the material according to claim 1, wherein the step of determining the theoretical Muller matrix spectrum $MM_{Cal}(E)$ of the material to be measured by the transfer matrix $T_m$ specifically comprises:

(1) determining a theoretical Jones matrix $J_{Cal}$ by the transfer matrix $T_m$:

$$J_{Cal} = \frac{1}{t_{11}t_{33}-t_{13}t_{31}} \begin{bmatrix} (t_{11}t_{43}-t_{13}t_{41}) & (t_{33}t_{41}-t_{31}t_{43}) \\ (t_{11}t_{23}-t_{13}t_{21}) & (t_{21}t_{33}-t_{23}t_{31}) \end{bmatrix}$$

wherein, the transfer matrix $$T_m = \begin{bmatrix} t_{11} & t_{12} & t_{13} & t_{14} \\ t_{21} & t_{22} & t_{23} & t_{24} \\ t_{31} & t_{32} & t_{33} & t_{34} \\ t_{41} & t_{42} & t_{43} & t_{44} \end{bmatrix};$$

and (2) determining the theoretical Muller matrix spectrum $MM_{Cal}(E)$ of the material to be measured by the theoretical Jones matrix $J_{Cal}$:

$$MM_{Cal}(E) = A(J_{Cal} \otimes J^*_{Cal})A^{-1}, \text{ where } A = \begin{bmatrix} 1 & 0 & 0 & 1 \\ 1 & 0 & 0 & -1 \\ 0 & 1 & 1 & 0 \\ 0 & i & -i & 0 \end{bmatrix}.$$

* * * * *